(12) United States Patent
Golly et al.

(10) Patent No.: US 10,884,014 B2
(45) Date of Patent: Jan. 5, 2021

(54) AIR DATA PROBE WITH FULLY-ENCAPSULATED HEATER

(71) Applicant: Rosemount Aerospace Inc., Burnsville, MN (US)

(72) Inventors: Timothy Thomas Golly, Lakeville, MN (US); Paul Robert Johnson, Prior Lake, MN (US); Greg Allen Seidel, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/363,650

(22) Filed: Mar. 25, 2019

(65) Prior Publication Data

US 2020/0309808 A1    Oct. 1, 2020

(51) Int. Cl.
| G01P 5/165 | (2006.01) |
| B23K 1/00 | (2006.01) |
| G01P 1/00 | (2006.01) |
| B64D 47/00 | (2006.01) |

(52) U.S. Cl.
CPC ............ G01P 5/165 (2013.01); B23K 1/0016 (2013.01); G01P 1/00 (2013.01); B64D 47/00 (2013.01)

(58) Field of Classification Search
None
See application file for complete search history.

(56) References Cited

U.S. PATENT DOCUMENTS

| 2,254,155 A | 8/1941 | Reichel |
| 2,343,282 A | 3/1944 | Daiber |
| 2,381,327 A | 8/1945 | Woodman et al. |
| 2,393,593 A | 1/1946 | Daiber |
| 2,399,370 A | 4/1946 | McOrlly |
| 2,428,542 A | 10/1947 | Bernhardt |
| 2,601,331 A | 6/1952 | Segal |
| 2,640,347 A | 6/1953 | Majeski |

(Continued)

FOREIGN PATENT DOCUMENTS

| CN | 2420633 Y | 2/2001 |
| CN | 102735888 A | 10/2012 |

(Continued)

OTHER PUBLICATIONS

Bifilar Coil, Wikipedia, as captured by the Internet Archive on Aug. 2, 2015, 3 pages.

(Continued)

*Primary Examiner* — Harshad R Patel
(74) *Attorney, Agent, or Firm* — Kinney & Lange, P.A.

(57) ABSTRACT

A probe head of an air data probe includes an insert, a portion of a heater, an outer shell, a tip weld, and a braze. The insert includes a tip portion making up a tip of the air data probe, an end portion, and a body portion extending between the tip portion and the end portion. The body portion includes a groove. The portion of the heater is positioned within the groove. The outer shell surrounds the body portion of the insert and the portion of the heater. The tip weld is located between the tip portion of the insert and a first end of the outer shell, and the braze is located between the end portion of the insert and a second end of the outer shell. The portion of the heater is hermetically sealed between the insert and the outer shell.

15 Claims, 15 Drawing Sheets

(56) References Cited

U.S. PATENT DOCUMENTS

| | | |
|---|---|---|
| 2,984,107 A | 5/1961 | Strieby et al. |
| 2,987,565 A | 6/1961 | Barnhart et al. |
| 3,267,992 A | 8/1966 | Werner et al. |
| 3,400,583 A | 9/1968 | Newport et al. |
| 3,535,930 A | 10/1970 | Rees |
| 3,590,460 A | 7/1971 | Highducheck et al. |
| 3,885,613 A | 5/1975 | Evans |
| 4,312,120 A | 1/1982 | Comer |
| 4,615,213 A | 10/1986 | Hagan |
| 4,836,019 A | 6/1989 | Hagen et al. |
| 5,025,661 A | 6/1991 | McCormack |
| 5,046,360 A | 9/1991 | Hedberg |
| 5,062,869 A | 11/1991 | Hagen |
| 5,130,707 A | 7/1992 | Hagen |
| 5,220,319 A | 6/1993 | Kendel |
| 5,228,563 A | 7/1993 | Stringham |
| 5,232,086 A | 8/1993 | Montanari |
| 5,392,622 A | 2/1995 | O'Donnell |
| 5,458,008 A | 10/1995 | Rassatt |
| 5,460,022 A | 10/1995 | Parsons |
| 5,466,067 A | 11/1995 | Hagen et al. |
| 5,487,291 A | 1/1996 | Voigt |
| 5,495,942 A | 3/1996 | Izhak |
| 5,543,183 A | 8/1996 | Streckert et al. |
| 5,621,936 A | 4/1997 | Penaligon et al. |
| 5,639,964 A | 6/1997 | Djorup |
| 5,653,538 A | 8/1997 | Phillips |
| 5,731,507 A | 3/1998 | Hagen et al. |
| 5,740,857 A | 4/1998 | Thompson et al. |
| 6,062,869 A | 5/2000 | Mizobuchi et al. |
| 6,070,475 A | 6/2000 | Muehlauser et al. |
| 6,079,845 A | 6/2000 | Kreider |
| 6,237,756 B1 | 5/2001 | Caudle |
| 6,371,286 B1 | 4/2002 | Montanari |
| 6,419,186 B1 | 7/2002 | Bachinski et al. |
| D463,989 S | 10/2002 | Bachinski et al. |
| 6,550,344 B2 | 4/2003 | Bachinski et al. |
| 6,591,696 B2 | 7/2003 | Bachinski |
| 6,612,166 B2 | 9/2003 | Golly et al. |
| 6,648,939 B2 | 11/2003 | Neuschwander et al. |
| 6,740,857 B1 | 5/2004 | Furlong et al. |
| 6,813,942 B1 | 11/2004 | Vozhdaev et al. |
| 6,840,672 B2 | 1/2005 | Ice et al. |
| 6,892,584 B2 | 5/2005 | Gilkison et al. |
| 6,941,805 B2 | 9/2005 | Seidel et al. |
| 7,370,526 B1 | 5/2008 | Ice |
| 7,483,223 B2 | 1/2009 | Egle et al. |
| 7,549,331 B1 | 6/2009 | Powell |
| 7,597,018 B2 | 10/2009 | Braun et al. |
| 7,705,275 B2 | 4/2010 | Umotoy et al. |
| 7,716,980 B1 | 5/2010 | Colten et al. |
| 7,915,567 B2* | 3/2011 | Lhuillier .................. H05B 3/48 |
| | | 219/270 |
| 7,937,977 B2 | 5/2011 | Booker |
| 8,060,334 B1 | 11/2011 | Jarvinen |
| 8,225,696 B2 | 7/2012 | Downes |
| 8,341,989 B1 | 1/2013 | Hamblin et al. |
| 8,365,591 B2 | 2/2013 | Golly et al. |
| 8,485,007 B2 | 7/2013 | Downes |
| 8,718,955 B2 | 5/2014 | Golly et al. |
| 8,857,255 B2 | 10/2014 | Anderson et al. |
| 9,080,903 B2 | 7/2015 | Ashton |
| 9,207,253 B2 | 12/2015 | Seidel et al. |
| 9,279,684 B2* | 3/2016 | Marty .................. G01C 21/00 |
| 9,366,555 B2 | 6/2016 | Schober et al. |
| 9,541,429 B2 | 1/2017 | Farokhi et al. |
| 9,664,542 B2 | 5/2017 | Gordon et al. |
| 9,722,345 B2 | 8/2017 | Arnesson et al. |
| 9,772,345 B2 | 9/2017 | Golly et al. |
| 9,791,304 B2 | 10/2017 | Wong et al. |
| 9,856,027 B2 | 1/2018 | Anderson et al. |
| 9,891,083 B2 | 2/2018 | Gordon et al. |
| 9,918,524 B2 | 3/2018 | Byrd et al. |
| 9,976,882 B2 | 5/2018 | Seidel et al. |
| 10,024,877 B2 | 7/2018 | Golly et al. |
| 10,040,570 B2 | 8/2018 | Heuer et al. |
| 10,227,139 B2* | 3/2019 | Golly .................. B64D 43/02 |
| 10,281,303 B2 | 5/2019 | Johnson et al. |
| 10,384,787 B2* | 8/2019 | Gordon .................. B64D 43/02 |
| 2004/0085211 A1 | 5/2004 | Gotfried |
| 2004/0093953 A1 | 5/2004 | Gilkison et al. |
| 2004/0177683 A1 | 9/2004 | Ice |
| 2004/0244477 A1 | 12/2004 | Zippold et al. |
| 2005/0011285 A1 | 1/2005 | Giterman |
| 2005/0179542 A1 | 8/2005 | Young |
| 2006/0144007 A1 | 7/2006 | Azarin |
| 2006/0207753 A1 | 9/2006 | Sanatgar et al. |
| 2007/0079639 A1 | 4/2007 | Hsu |
| 2010/0000885 A1 | 1/2010 | Downes |
| 2010/0123549 A1 | 5/2010 | Lickfelt et al. |
| 2011/0036160 A1 | 2/2011 | Pineau et al. |
| 2012/0280498 A1 | 11/2012 | Irwin et al. |
| 2013/0014586 A1 | 1/2013 | Walling et al. |
| 2013/0145862 A1 | 6/2013 | Leblond et al. |
| 2014/0053644 A1 | 2/2014 | Anderson et al. |
| 2014/0156226 A1 | 6/2014 | Hashemian et al. |
| 2014/0332192 A1 | 11/2014 | Cosby, II et al. |
| 2015/0356393 A1 | 12/2015 | Daoura et al. |
| 2016/0091355 A1 | 3/2016 | Mesnard et al. |
| 2016/0280391 A1 | 9/2016 | Golly et al. |
| 2017/0052046 A1 | 2/2017 | Gordon et al. |
| 2017/0092030 A1 | 3/2017 | Badger, II |
| 2017/0108360 A1 | 4/2017 | Wong et al. |
| 2017/0169974 A1 | 6/2017 | Miyakawa et al. |
| 2017/0369175 A1 | 12/2017 | Gordon et al. |
| 2018/0128849 A1* | 5/2018 | Wong .................. G01K 13/028 |
| 2018/0209863 A1 | 7/2018 | Golly et al. |
| 2018/0259547 A1* | 9/2018 | Abdullah .................. G01P 5/165 |
| 2018/0259548 A1* | 9/2018 | Anderson .................. G01P 5/165 |
| 2020/0114428 A1 | 4/2020 | Golly et al. |

FOREIGN PATENT DOCUMENTS

| | | |
|---|---|---|
| EP | 0737315 A1 | 10/1996 |
| EP | 3073275 A2 | 9/2016 |
| EP | 3076185 A1 | 10/2016 |
| EP | 3133403 A1 | 2/2017 |
| EP | 3214704 A1 | 9/2017 |
| EP | 3499217 A2 | 6/2019 |
| GB | 562880 | 7/1944 |
| GB | 1118794 | 7/1968 |
| WO | WO9613727 A1 | 5/1996 |
| WO | WO9816837 A1 | 4/1998 |
| WO | WO0111582 A1 | 2/2001 |
| WO | WO0167115 A2 | 9/2001 |
| WO | WO0177622 A2 | 10/2001 |

OTHER PUBLICATIONS

Extended European Search Report for European Patent Application No. 18207317.1, dated May 24, 2019, 7 pages.
Extended European Search Report for European Patent Application No. 19207424.3, dated Mar. 13, 2020, 8 pages.
Extended European Search Report for European Patent Application No. 19215840.0, dated Jul. 3, 2020, 14 pages.
Extended European Search Report for European Patent Application No. 19213580.4, dated Jun. 26, 2020, 13 pages.

* cited by examiner

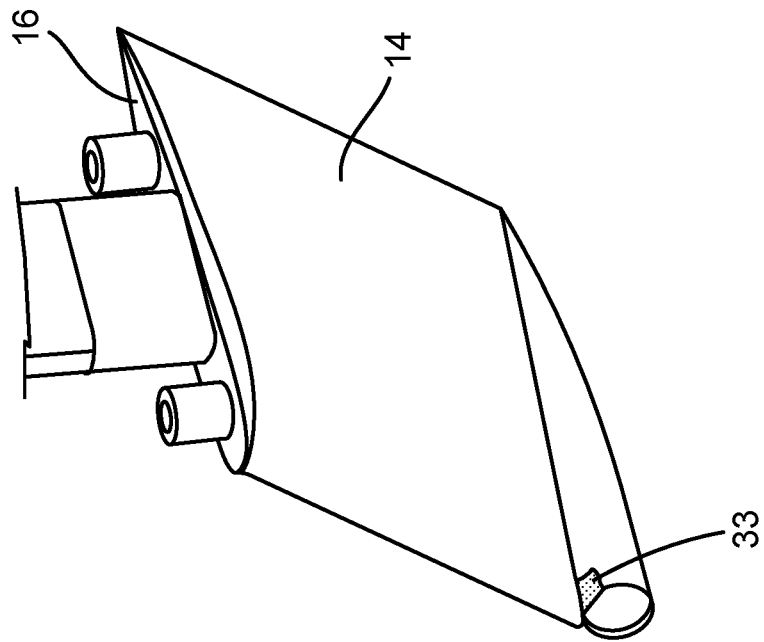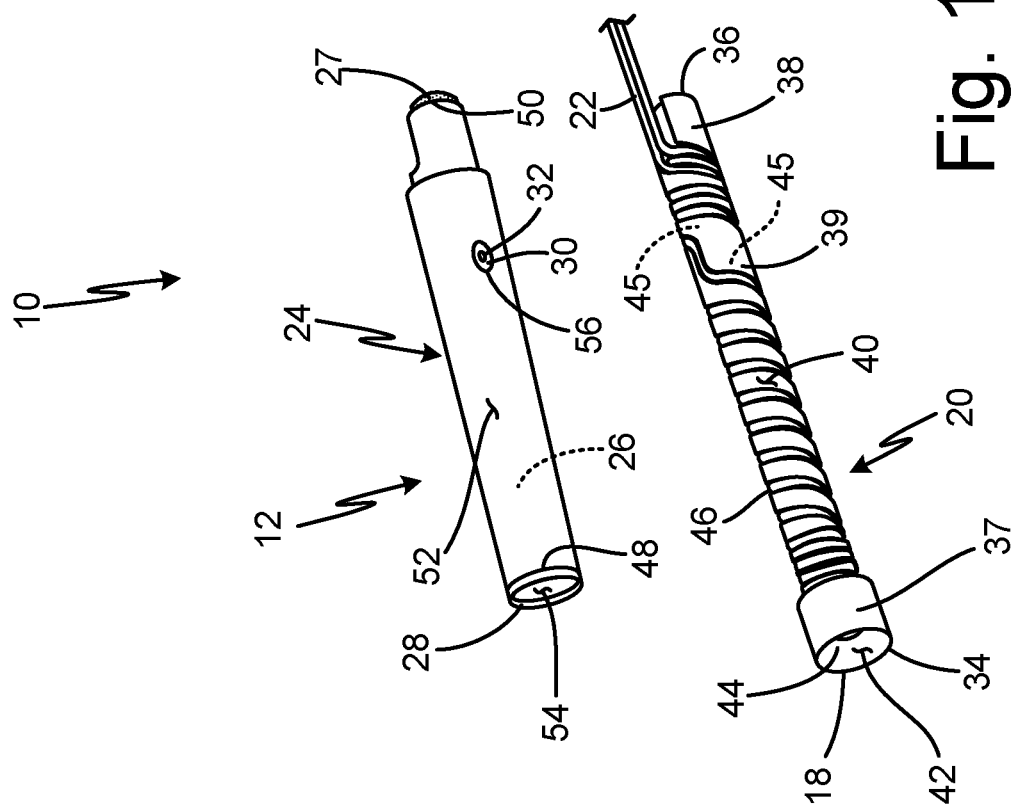
Fig. 1B

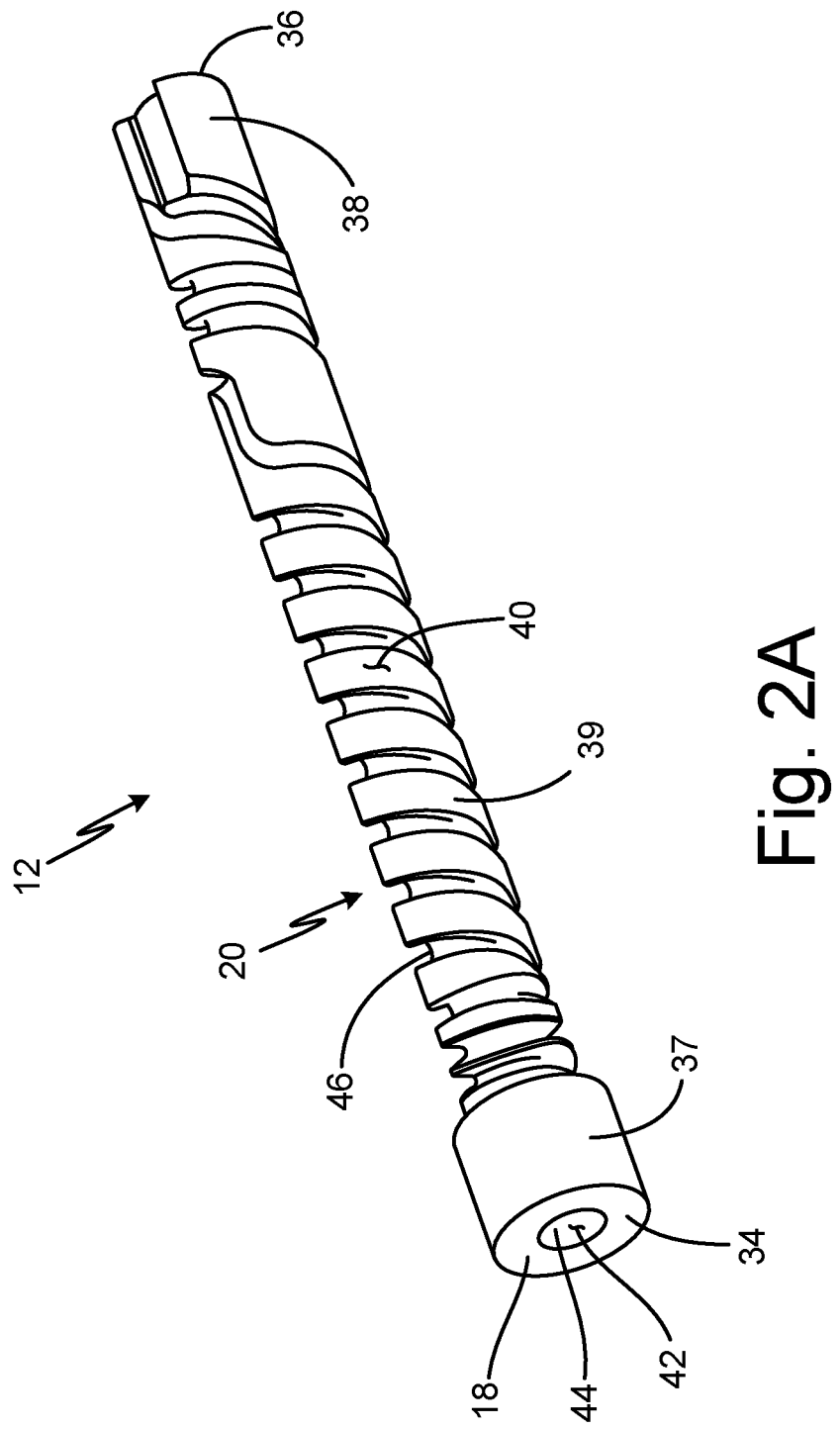

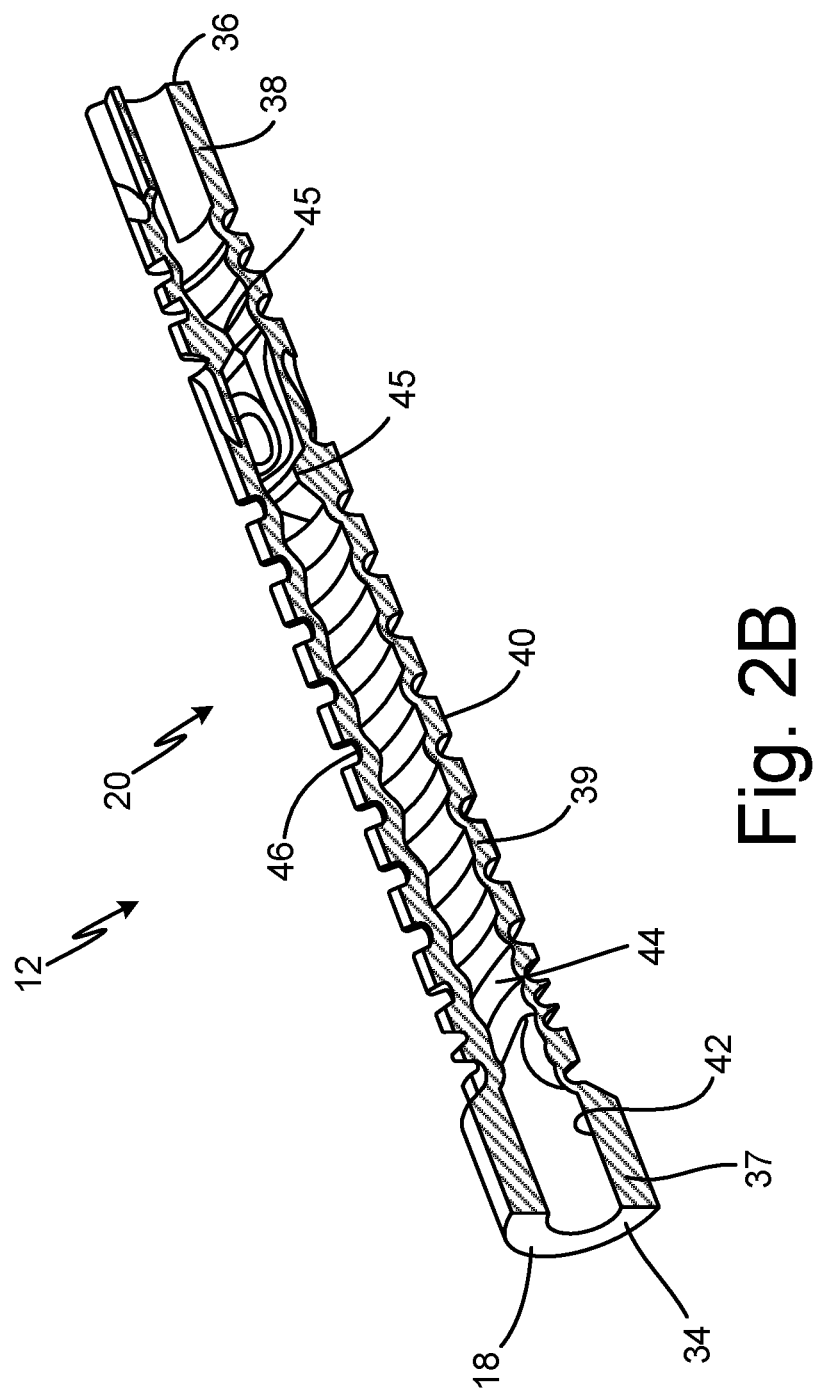

AIR DATA PROBE WITH FULLY-ENCAPSULATED HEATER

BACKGROUND

The present disclosure relates to air data probes, and in particular, to pitot probes.

Air data probes such as pitot probes are installed on aircraft to measure air data parameters. Pitot probes are exposed to the environmental conditions exterior to the aircraft, which are often cold. As such, heaters are positioned within pitot probes to ensure the pitot probes function properly in rain and icing environments. The heater is generally connected to the probe head of the pitot probe. Heaters are susceptible to failure caused by corrosion due to environmental contamination.

SUMMARY

A probe head of an air data probe includes an insert, a portion of a heater, an outer shell, a tip weld, and a braze. The insert includes a tip portion making up a tip of the air data probe, an end portion, and a body portion extending between the tip portion and the end portion. The body portion includes a groove. The portion of the heater is positioned within the groove. The outer shell surrounds the body portion of the insert and the portion of the heater. The tip weld is located between the tip portion of the insert and a first end of the outer shell, and the braze is located between the end portion of the insert and a second end of the outer shell. The portion of the heater is hermetically sealed between the insert and the outer shell A probe head of an air data probe includes an insert, an electric resistance heater, an outer shell, and a drain hole or a sensing port. The insert includes a first end, a second end opposite the first end, a helical groove extending into an exterior surface of the insert between the first end and the second end, and a bore extending through the insert. The heater is positioned within the helical groove of the insert. The outer shell surrounds the insert and the heater and is connected to the insert and the heater via a first braze. The outer shell includes a first end, a second end opposite the first end, a hole in the outer shell, the hole extending from an exterior surface of the outer shell to an interior surface of the outer shell, and a hole weld filling the hole in outer shell and extending to the insert. The drain hole or sensing port extends into the bore in the insert through the weld in the outer shell and through the insert. The first end of the insert extends beyond the first end of the outer shell, and the second end of the insert extends to the second end of the outer shell.

A method of forming a probe head includes inserting an insert with a portion of a heater into an outer shell of the probe head, brazing the outer shell to the insert and the portion of the heater, welding a gap between a tip portion of the insert at a first end of the insert and a first end of the outer shell, brazing an end portion of the insert and a second end of the outer shell, and hermetically sealing the portion of the heater between the insert and the outer shell.

BRIEF DESCRIPTION OF THE DRAWINGS

FIG. 1B is a partial exploded view of the pitot probe.
FIG. 2A is a perspective view of an insert of the probe head.
FIG. 2B is a cross-sectional view of the insert of the probe head.

DETAILED DESCRIPTION

In general, the present disclosure describes a probe head of an air data probe (such as a pitot probe or a pitot-static probe) that is formed by brazing an insert with a heater wound around a groove in the insert to an outer shell, welding the gap, or joint, between the insert and a first end of the outer shell and a hole in the outer shell, brazing the insert and a second end of the outer shell, drilling a hole into the hole weld, machining the probe head to a final contour, attaching the probe head to the strut, and brazing the connection of the probe head to the strut. The insert makes up the tip of the probe head and extends past ends of the outer shell such that the heater can be completely sealed from the external environment when the probe head is welded and brazed externally at both ends. Further, the hole extends through the hole weld and the insert to form a hole while maintaining a complete seal between the heater and the external environment.

Figure 1A:
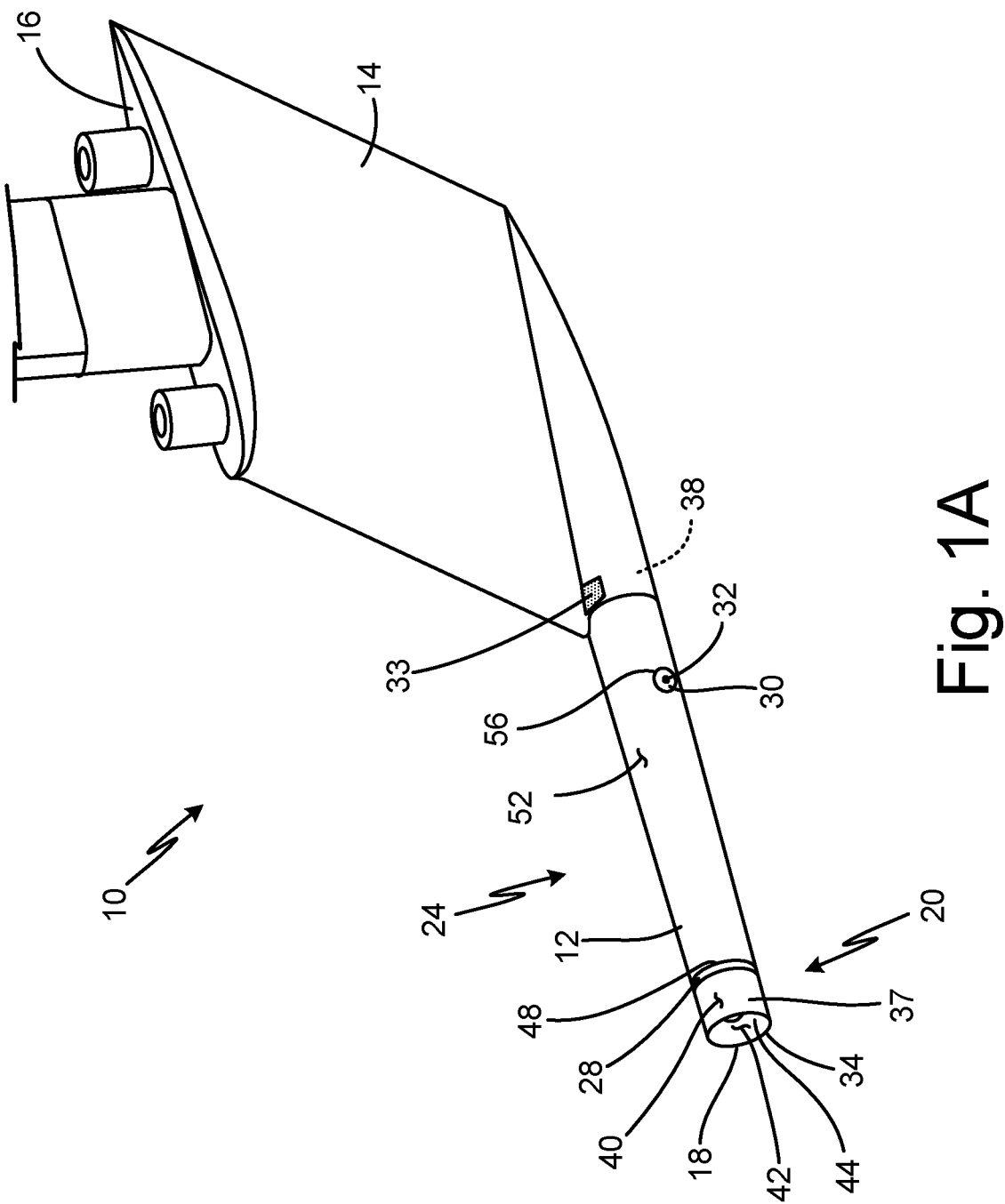
FIG. 1A is a perspective view of a pitot probe.

FIG. 1A is a perspective view of pitot probe 10. FIG. 1B is a partial exploded view of pitot probe 10. FIGS. 1A and 1B will be discussed together to describe the components of pitot probe 10. Pitot probe 10 includes probe head 12, strut 14, and mounting flange 16. Probe head 12 includes tip 18, insert 20, heater 22 (shown in FIG. 1B), outer shell 24, first braze 26 (shown in FIG. 1B), second braze 27 (shown in FIG. 1B), tip weld 28, hole weld 30, hole 32, and third braze 33. Insert 20 includes first end 34, second end 36 (shown in FIG. 1B), tip portion 37, end portion 38, body portion 39 (shown in FIG. 1B), exterior surface 40, interior surface 42, bore 44, water dams 45, and groove 46 (shown in FIG. 1B). Outer shell 24 includes first end 48, second end 50 (shown in FIG. 1B), exterior surface 52, interior surface 54 (shown in FIG. 1B), and hole 56.

Pitot probe 10 is an air data probe. In alternate embodiments, pitot probe 10 may be any other suitable air data probe, including, for example, a pitot-static probe. Probe head 12 is hollow and substantially cylindrical. Internal components of pitot probe 10 are located within probe head 12. Probe head 12 is the sensing head of pitot probe 10. Probe head 12 is connected to a first end of strut 14. A second end of strut 14 is connected to mounting flange 16. As such, strut 14 connects probe head 12 to mounting flange 16. Strut 14 is blade-shaped. Internal components of pitot probe 10 are located within strut 14. Mounting flange 16 makes up a mount of pitot probe 10. Mounting flange 16 may include mounting holes and is connectable to an aircraft.

Tip 18 of probe head 12 is at an end of probe head 12 opposite the end of probe head 12 connected to strut 14. Insert 20 forms tip 18. Insert 20 is also hollow and substantially cylindrical. Insert 20 may be additively manufactured. Heater 22 is wire-like and is helically wound around insert 20. Heater 22 is an electric resistance heater. Outer shell 24 is substantially cylindrical and surrounds insert 20 and a portion of heater 22 such that the portion of heater 22 in probe head 12 is between insert 20 and outer shell 24. Outer shell 24 is connected to insert 20 and heater 22 via first braze 26. As such, first braze 26 is between insert 20 with heater 22 and outer shell 24. First braze 26 is adequate for heat transfer but may be incomplete with voids or other defects. Second braze 27 connects and hermetically seals an end of insert 20 and an end of outer shell 24. Tip weld 28 is between insert 20 and outer shell 24 to connect and seal insert 20 and outer shell 24 near tip 18. Hole weld 30 is a weld extending through and filling a hole in outer shell 24. Hole weld 30 extends to insert 20. Hole 32 is a hole that extends through outer shell 24 at hole weld 30 and through insert 20. Hole 32 may be a drain hole, a sensing port such as a static port, an angle of attack port, or an alpha port, or any other suitable hole. Probe head 12 may have one hole 32, two holes 32, or any other suitable number of holes 32. Hole 32 is hermetically sealed from heater 22. Third braze 33 connects and seals insert 20, second braze 27, and outer shell 24 to strut 14.

Insert 20 has first end 34 at one end of insert 20 and second end 36 at the other end of insert 20 opposite first end 34. First end 34 makes up tip 18 of probe head 12. Second end 36 is attached to strut 14. Tip portion 37 of insert 20 is at first end 34. End portion 38 is at second end 36. Body portion 39 of insert 20 is connected to and extends between tip portion 37 and end portion 38. As such, tip portion 37, end portion 38, and body portion 39 make up insert 20. Tip portion 37 has an outer diameter greater than an outer diameter of end portion 38 and body portion 39. Exterior surface 40 is an outer surface of insert 20 and extends from first end 34 to second end 36. Interior surface 42 is an inner surface of insert 20 and extends from first end 34 to second end 36. Interior surface 42 may be smooth, conform to heater 22, or have any other suitable shape or texture. Interior surface 42 defines bore 44. Bore 44 is an opening of probe head 12 that ends from first end 34 to second end 36 within insert 20. As such, bore 44 extends into probe head 12 from tip 18. Interior surface 42 also defines water dams 45, which are integral to insert 20. Water dams 45 may be near holes 32. Groove 46 extends into exterior surface 40 of insert 20. Groove 46 winds along insert 20 between first end 34 and second end 36. Specifically, groove 46 extends across body portion 39 and end portion 38 of insert 20. Groove 46 is helical at body portion 39. A portion of heater 22 is positioned within groove 46. As a result, the portion of heater 22 within probe head 12 is helical.

Outer shell 24 has first end 48 at one end of outer shell 24 and second end 50 at the other end of outer shell 24 opposite first end 48. Insert 20 extends through outer shell 24 such that insert 20 extends beyond first end 48 of outer shell 24 and beyond second end 50 of outer shell 24. Exterior surface 52 is an outer surface of outer shell 24 and extends from first end 48 to second end 50. Interior surface 54 is an inner surface of outer shell 24 and extends from first end 48 to second end 50. Hole 56 extends through outer shell 24 from exterior surface 52 to an interior surface 54.

First braze 26 extends from first end 48 of outer shell 24 to second end 50 of outer shell 24 and along body portion 39 of insert 20. Tip weld 28 is between insert 20 and first end 48 of outer shell 24 to fill gap G between tip portion 37 of insert 20 and first end 48 of outer shell 24. Tip weld 28 connects and seals exterior surface 40 of insert 20 and exterior surface 52 of outer shell 24. End portion 38 of insert 20 and second end 50 of outer shell 24 are connected via second braze 27. Second end 36 of insert 20, second braze 27, and second end 50 of outer shell 24 are connected to strut 14 via third braze 33. Hole weld 30 fills hole 56 in outer shell 24 and extends to exterior surface 40 of insert 20 at body portion 39. As such, hole weld 30 extends from exterior surface 52 of outer shell 24 to interior surface 54 of outer shell 24 and exterior surface 40 of insert 20. Hole 32 extends into bore 44 through outer shell 24 at hole weld 30 in hole 56 and through insert 20 such that hole 32 provides fluidic communication between bore 44 and an outside of outer shell 24 while being hermetically sealed from heater 22. As such, heater 22 within probe head 12 is fully encapsulated and hermetically sealed between insert 20 and outer shell 24.

Pitot probe 10 is installed on an aircraft. Pitot probe 10 may be mounted to a fuselage of the aircraft via mounting flange 16 and fasteners, such as screws or bolts. Strut 14 holds probe head 12 away from the fuselage of the aircraft to expose probe head 12 to external airflow. Probe head 12 takes in air at tip 18 from surrounding external airflow via bore 44 in insert 20. Air pressures from probe head 12 are communicated pneumatically through bore 44 in probe head 12 and internal components and passages of strut 14. Pressure measurements are communicated to a flight computer and can be used to generate air data parameters related to the aircraft flight condition.

Heater 22 transmits heat to outer shell 24 of probe head 12 to prevent ice accumulation on pitot probe 10, which can interfere with the functionality of pitot probe 10. Because insert 20 extends past first end 48 of outer shell 24 and makes up tip 18 of probe head 12, heater 22 can be placed closer to tip 18, and probe head 12 has additional mass near tip 18. Insert 20 extending from first end 48 to second end 50 of outer shell 24, tip weld 28 at first end 48 of outer shell 24, and second braze 27 at second end 50 of outer shell 24 allows for full encapsulation of heater 22 between insert 20 and outer shell 24. Water dams 45 redirect, or knock down, water particles in the airflow moving through bore 44. Hole 32 through hole weld 30 ensures that probe head 12 can include hole 32, such as a drain hole for water to exit bore 44, while maintaining a hermetic seal between heater 22 within probe head 12 and the external environment.

Typically, pitot probes are exposed to environmental contamination from the external environment, such as water, salts, acids, or other industrial contaminants, which can lead to loss of functionality or corrosion of the heater. For example, the heater can rapidly fail as a result of corrosion, necessitating replacement of the probe. In probes without inserts, the exterior sheath of the heater is normally exposed to environmental contamination.

Because heater 22 can be placed closer to tip 18 and probe head 12 has additional mass near tip 18, heat transfer to tip 18 is improved. Thermal control of pitot probe 10 is also improved, decreasing temperature spikes in heater 22 and resulting in lower maximum operating temperatures. Further, because an entirety of heater 22 within probe head 12 is sealed between insert 20 and outer shell 24, heater 22 is protected from the external environment and not directly exposed to moisture or other contamination that could induce corrosion.

Figure 3:
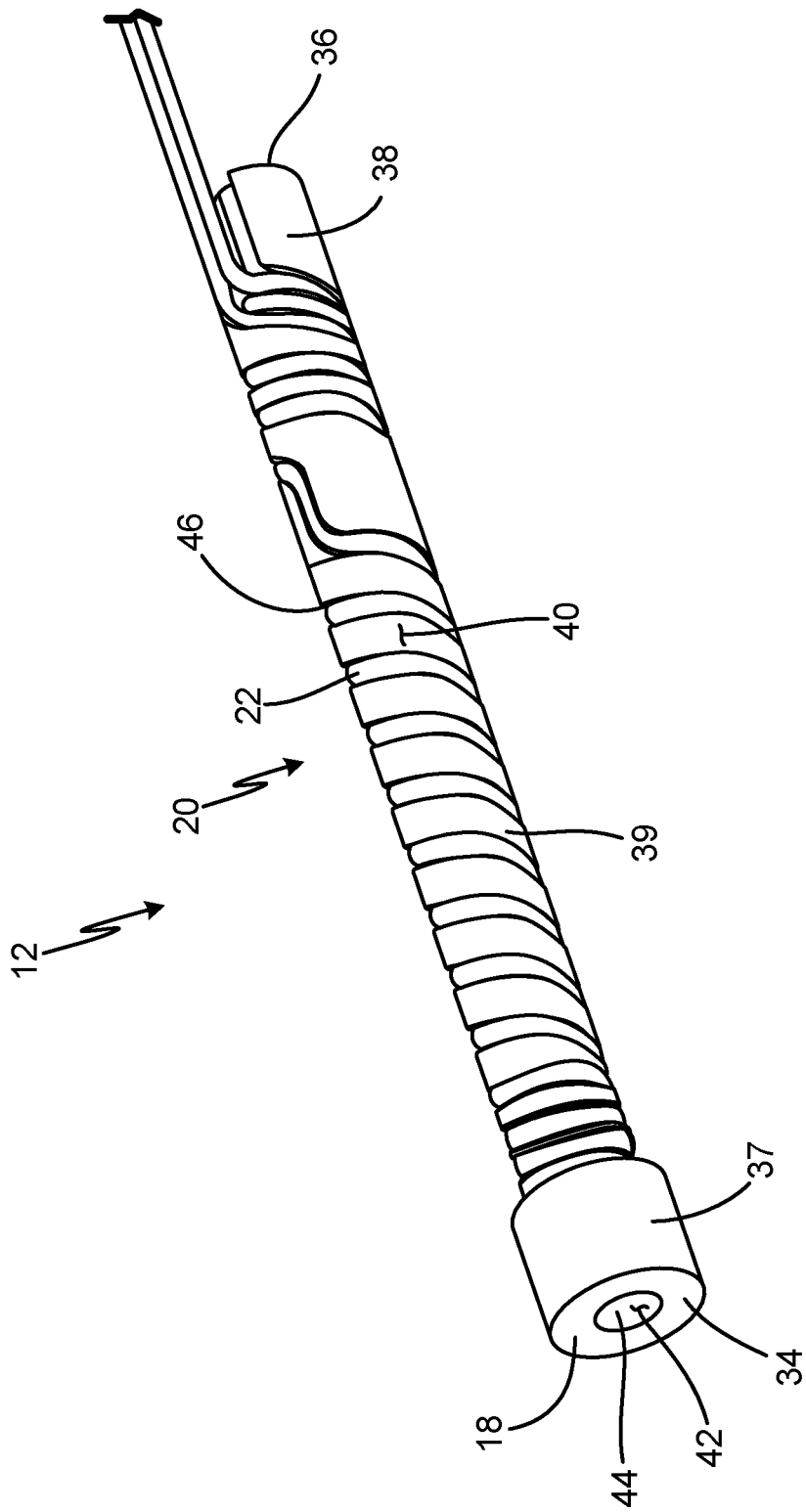
FIG. 3 is a perspective view of a heater wrapped around the insert.
Figure 4:
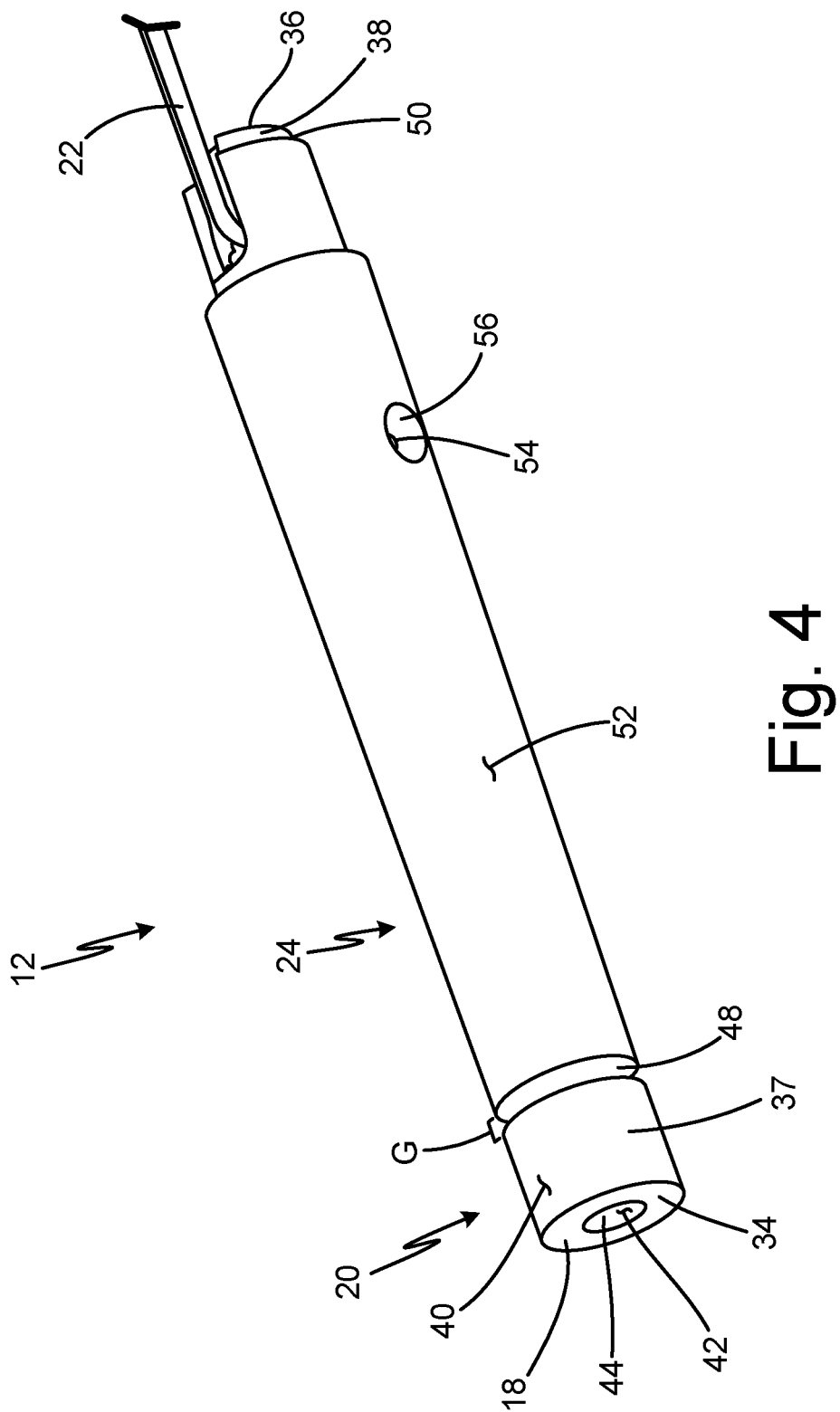
FIG. 4 is a perspective view of the insert and the heater inside an outer shell of the probe head.
Figure 5A:
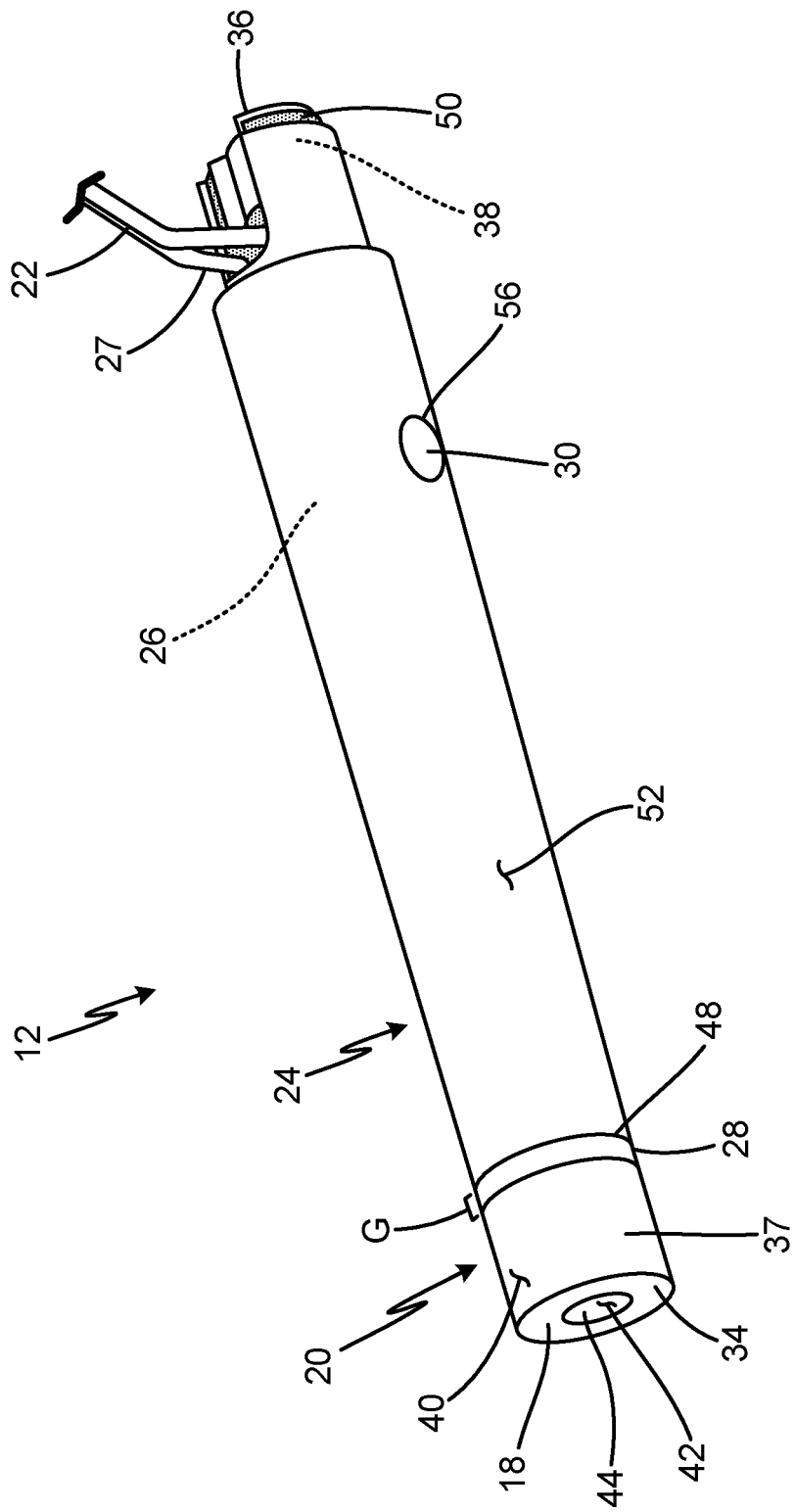
FIG. 5A is a perspective view of the insert and the outer shell including braze and welds.
Figure 5B:
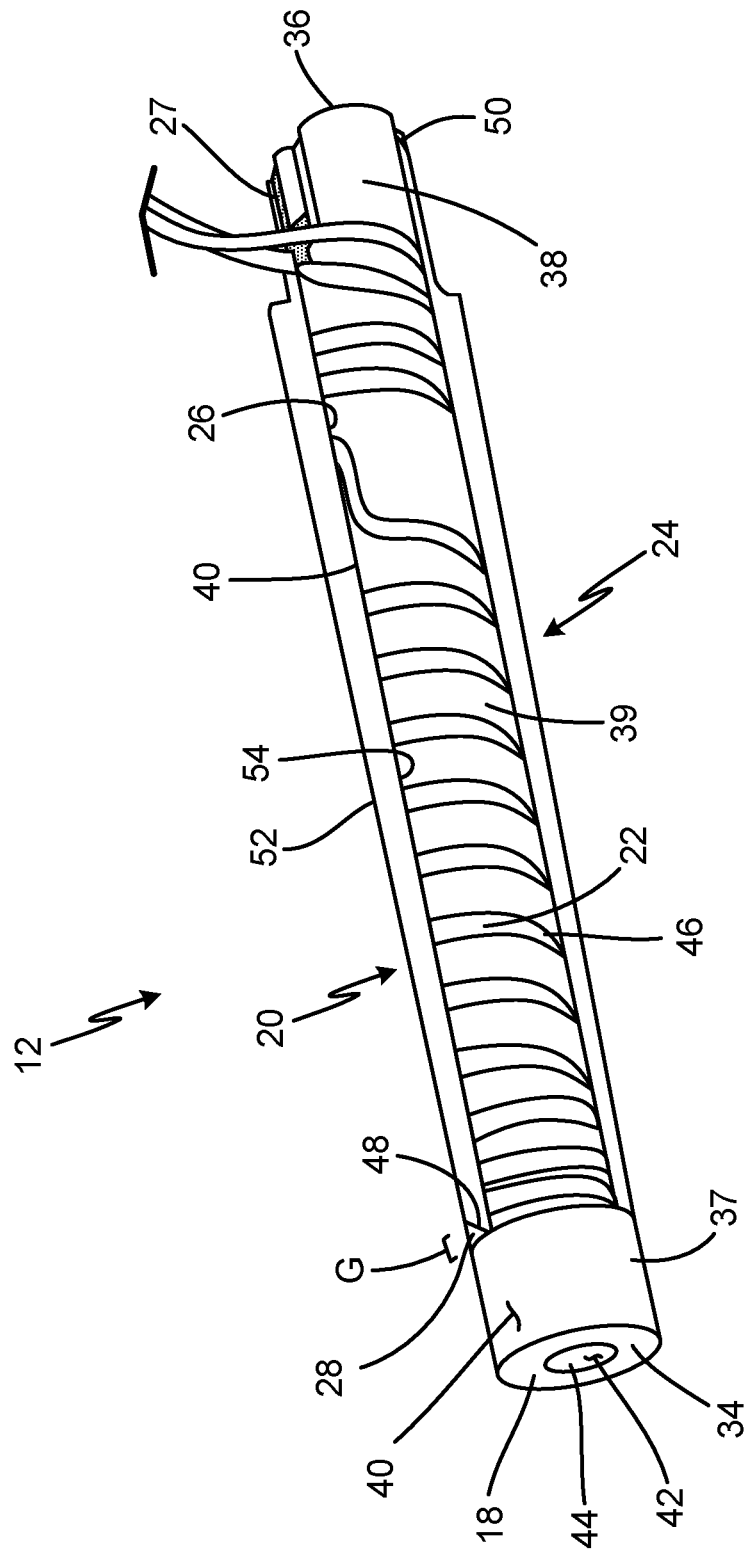
FIG. 5B is a partial cross-sectional view of the insert and the outer shell including braze and welds.
Figure 5C:
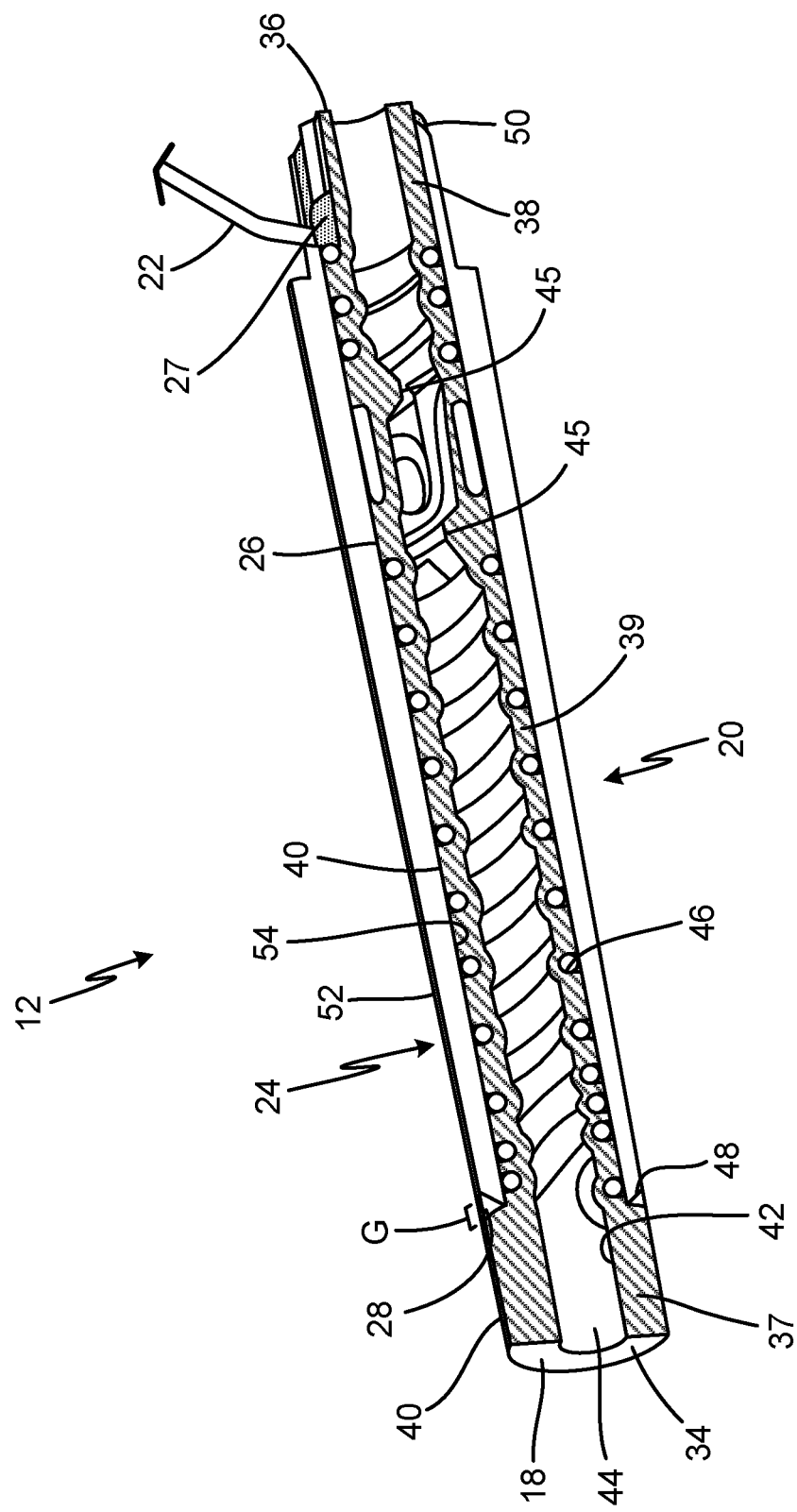
FIG. 5C is a cross-sectional view of the insert and the outer shell including braze and welds.
Figure 6:
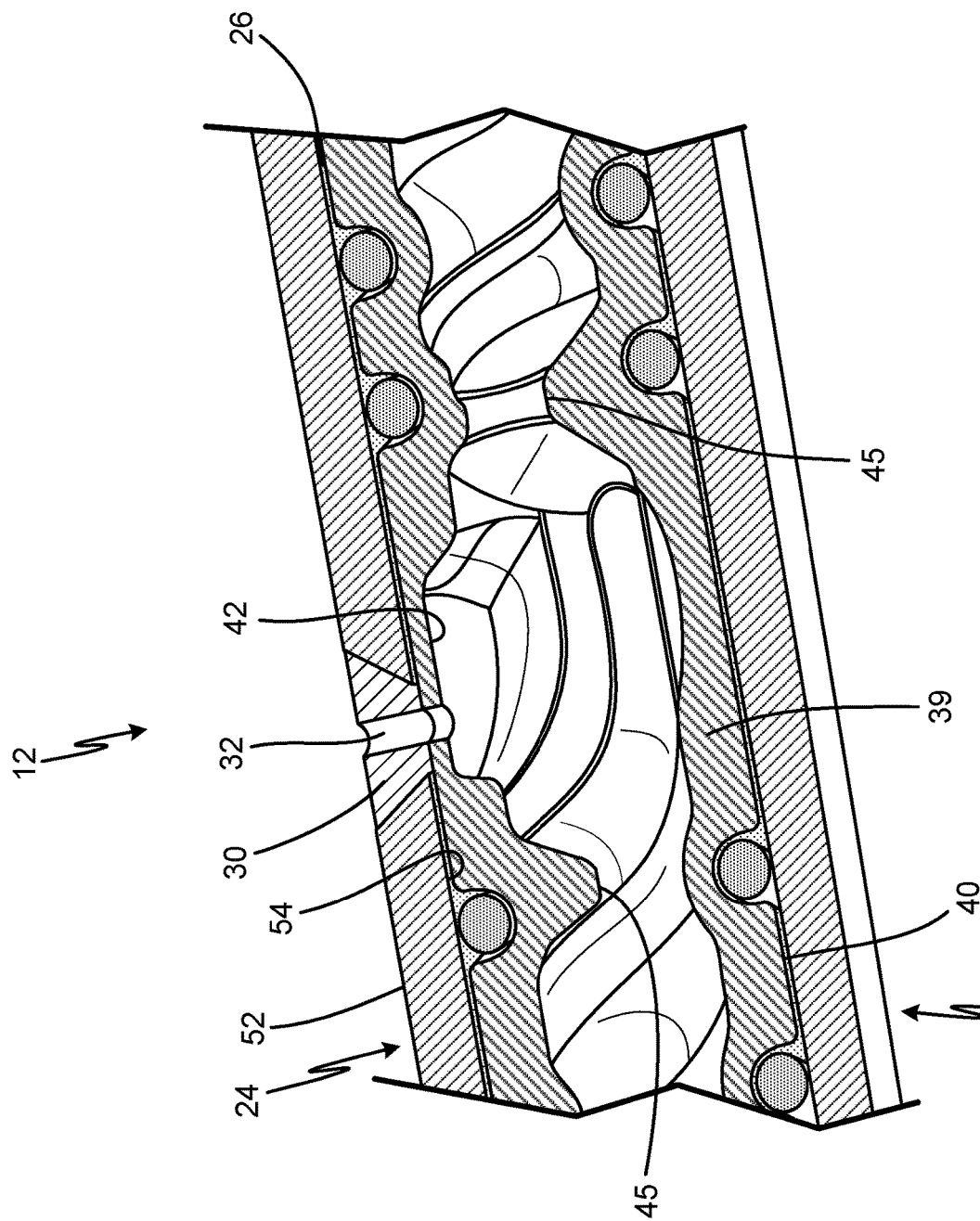
FIG. 6 is a partial cross-sectional view of a hole drilled into the probe head.
Figure 7:
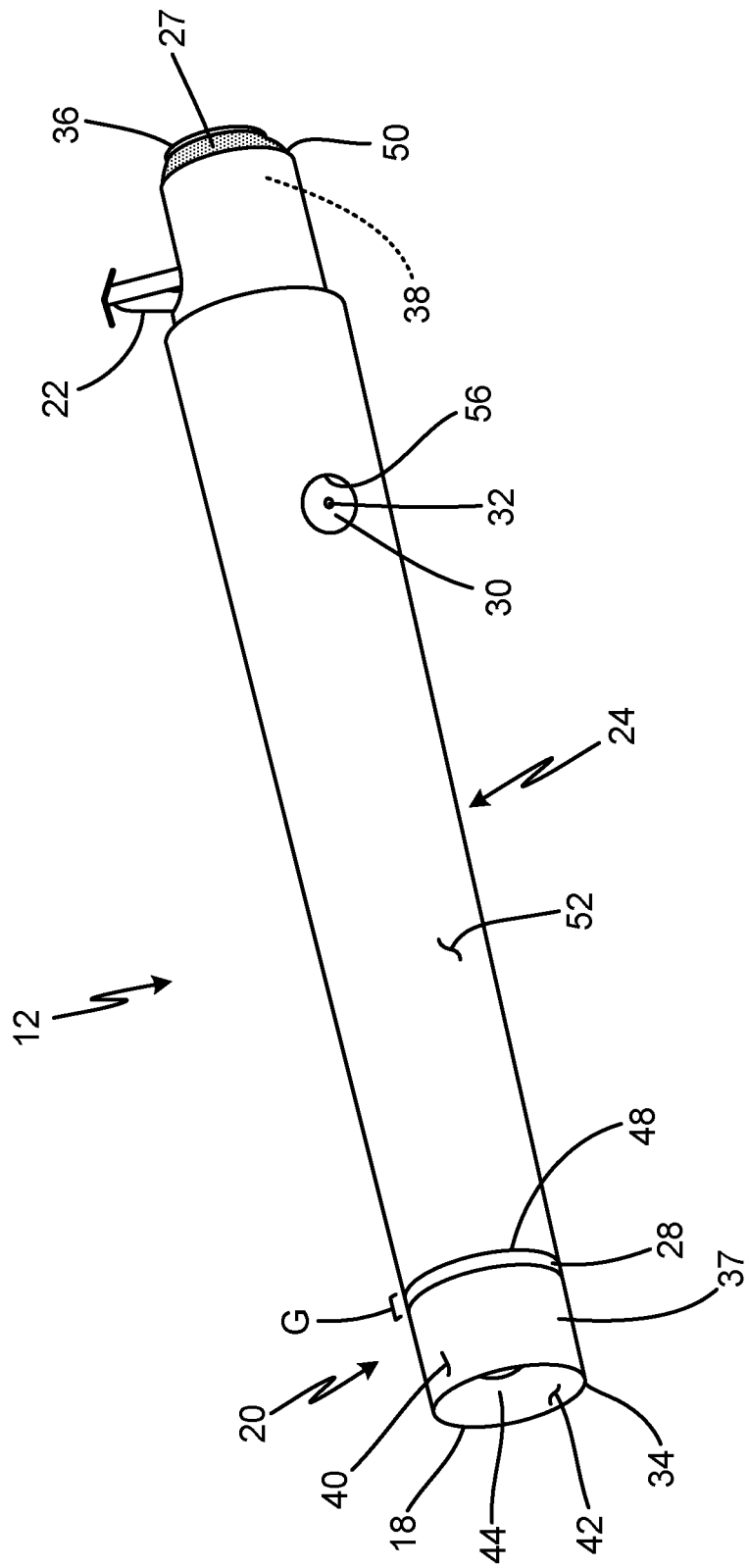
FIG. 7 is a perspective view of the probe head after machining.
Figure 8:
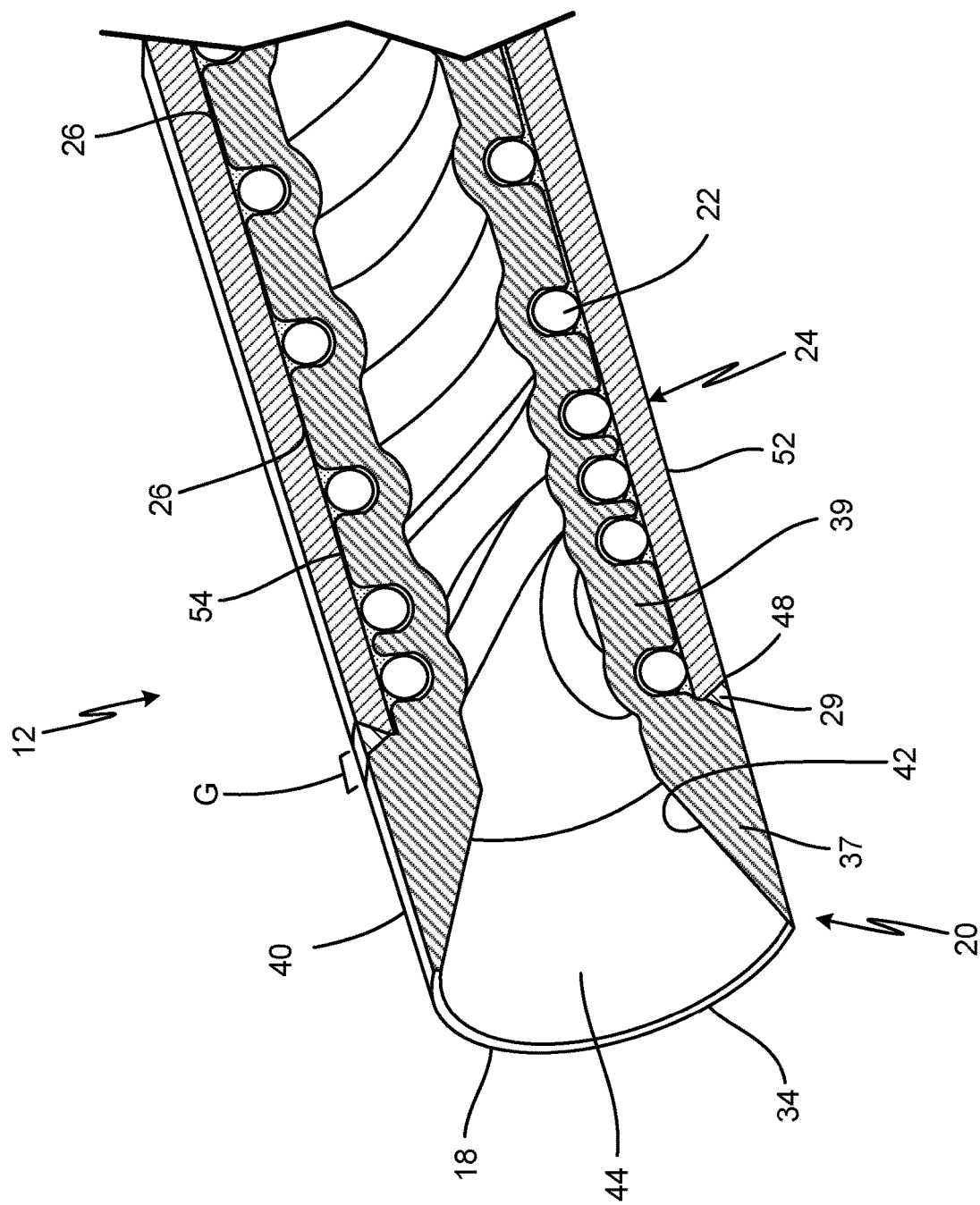
FIG. 8 is a partial cross-sectional view of the probe head after machining.
Figure 9A:
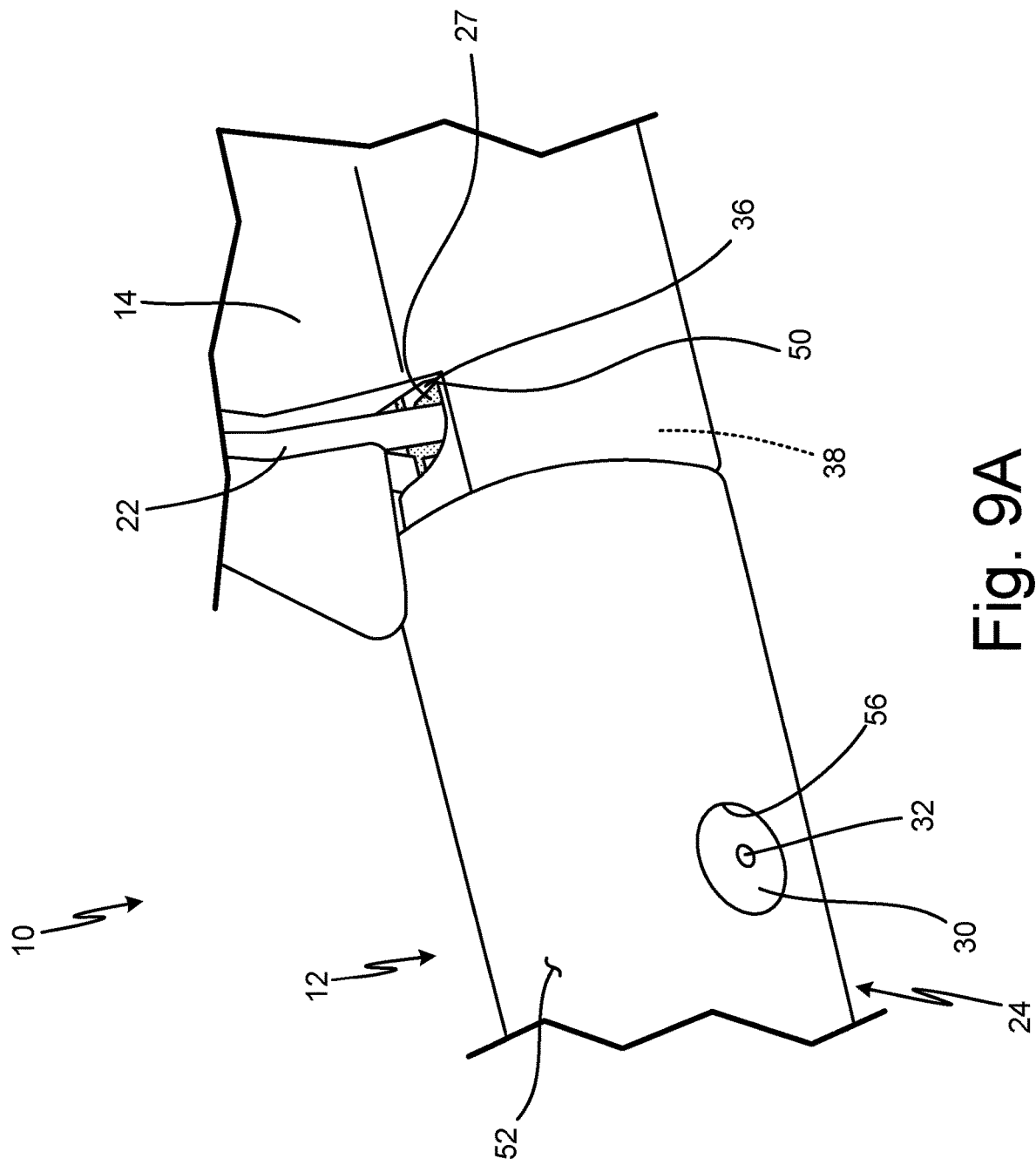
FIG. 9A is a partial perspective view of the probe head assembled to a strut with the heater wrapped around the strut.
Figure 9B:
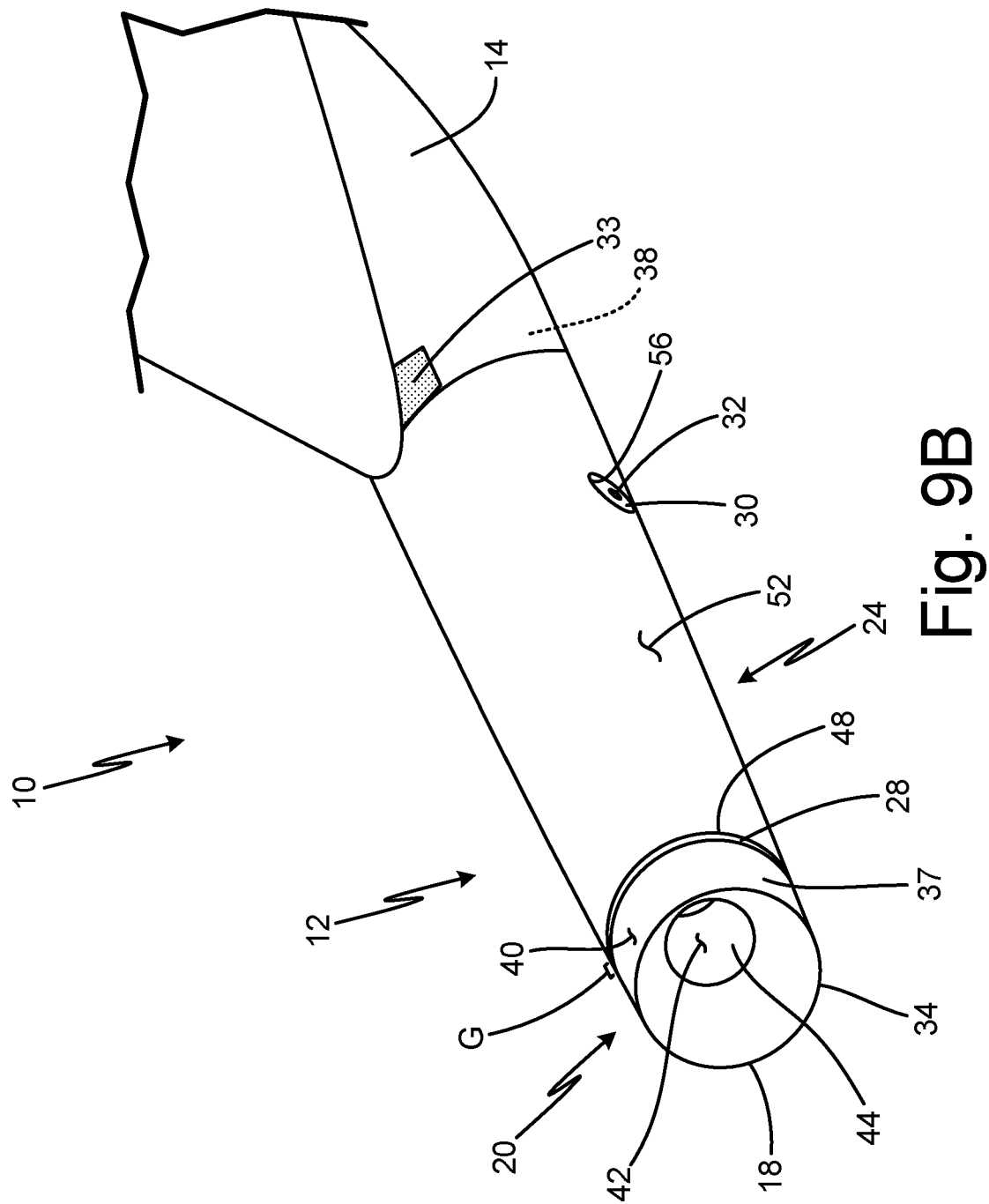
FIG. 9B is a partial perspective view of the probe head assembled to the strut and including braze.

FIGS. 2A-9B illustrate the method for forming pitot probe 10. FIG. 2A is a perspective view of insert 20 of probe head 12. FIG. 2B is a cross-sectional view of insert 20 of probe head 12. FIG. 3 is a perspective view of heater 22 wrapped around insert 20. FIG. 4 is a perspective view of insert 20 and heater 22 inside outer shell 24 of probe head 12. FIG. 5A is a perspective view of insert 20 and outer shell 24 including first braze 26 and second braze 27 and welds 28 and 30. FIG. 5B is a partial cross-sectional view of insert 20 and outer shell 24 including first braze 26, second braze 27, and weld 28. Insert 20 and heater 22 are not shown in cross-section in FIG. 5B. FIG. 5C is a cross-sectional view of insert 20 and outer shell 24 including first braze 26, second braze 27, and weld 28. FIG. 6 is a partial cross-sectional view of hole 32 drilled into probe head 12. FIG. 7 is a perspective view of probe head 12 after machining. FIG. 8 is a partial cross-sectional view of probe head 12 after machining. FIG. 9A is a partial perspective view of probe head 12 assembled to strut 14 with heater 22 wrapped around strut 14. FIG. 9B is a partial perspective view of probe head 12 assembled to strut 14 and including third braze 33.

Pitot probe 10 includes probe head 12 and strut 14. Probe head 12 includes tip 18, insert 20, heater 22, outer shell 24, first braze 26, second braze 27, tip weld 28, hole weld 30, hole 32, and third braze 33. Insert 20 includes first end 34, second end 36, tip portion 37, end portion 38, body portion 39, exterior surface 40, interior surface 42, bore 44, water dams 45, and groove 46. Outer shell 24 includes first end 48, second end 50, exterior surface 52, interior surface 54, and hole 56.

FIGS. 2A and 2B show insert 20 with groove 46. Groove 46 extends along body portion 39 and end portion 38 of insert 20 such that body portion 39 and end portion 38 include groove 46. Groove 46 extends from a first end to a second end of body portion 39 and from a first end to a second end of end portion 38, or from an end of tip portion 37 to second end 36 of insert 20. Groove 46 does not extend through tip portion 37 of insert 20. As such, groove 46 does not extend to first end 34 of insert 20, or tip 18. Groove 46 has a depth and width to accept heater 22. Water dams 45 extend into bore 44 at body portion 39 of insert 20.

FIG. 3 shows heater 22 wrapped around insert 20. Heater 22 is helically wound into groove 46 in insert 20. Heater 22 can fill the entire length of groove 46. Heater 22 extends along an entire body portion 39 of insert 20, from an end of tip portion 37. Heater 22 can extend to second end 36 of insert 20.

FIG. 4 shows insert 20 and heater 22 inside outer shell 24. Outer shell 24 is hollow to accept insert 20 and heater 22. Insert 20 with helically wound heater 22 is inserted into first end 48 of outer shell 24. End portion 38 and body portion 39 are inserted into outer shell 24 such that outer shell 24 covers insert 20 from first end 48 to second end 50. End portion 38 extends beyond second end 50 of outer shell 24. As such, second end 36 of insert 20 extends beyond second end 50 of outer shell 24. Tip portion 37 has an outer diameter greater than an inner diameter of outer shell 24, and therefore, tip portion 37 is not inserted into outer shell 24. Tip portion 37 of insert 20 extends beyond first end 48 of outer shell 24, making up tip 18. As such, first end 48 of outer shell 24 and an end of tip portion 37 of insert 20 adjacent outer shell 24 form gap G.

FIGS. 5A, 5B, and 5C show insert 20 and heater 22 brazed to outer shell 24. Outer shell 24 is vacuum brazed to insert 20 and heater 22, resulting in the formation of a layer of first braze 26. First braze 26 forms a layer between insert 20 with heater 22 and outer shell 24. First braze 26 connects insert 20 and heater 22 to outer shell 24 such that heat from heater 22 is transferred to outer shell 24. First braze 26 extends along exterior surface 40 of body portion 39 of insert 20. After brazing insert 20 with heater 22 to outer shell 24, end portion 38 of insert 20 and second end 50 of outer shell 24 are torch brazed externally to form second braze 27. Second braze 27 extends between end portion 38 of insert and second end 50 of outer shell to seal probe head 12.

Further, FIGS. 5A, 5B, and 5C show tip weld 28 and hole weld 30 in probe head 12. After brazing insert 20 with heater 22 to outer shell 24, probe head 12 is welded externally, such as via additive laser welding, resulting in tip weld 28 and hole weld 30. Gap G between tip portion 37 of insert 20 and first end 48 of outer shell is welded to form tip weld 28. As such, tip weld 28 fills gap G between first end 48 of outer shell 24 and an end of tip portion 37 of insert 20 to seal insert 20 and outer shell 24. Thus, tip weld 28 is at first end 48 of outer shell 24. Hole 56 in outer shell 24 is also welded to form hole weld 30. Hole weld 30 fills hole 56 in outer shell 24.

FIG. 6 shows hole 32 drilled into probe head 12. Hole 32 extends from exterior surface 52 of outer shell to interior surface 42 of insert 20. Hole 32 extends through outer shell 24 at hole weld 30. Hole 32 allows bore 44 to be in fluid communication with the external environment. As such, when hole 32 is a drain hole, water within bore 44 of probe head 12 can be knocked down by water dams 45 and drain out of probe head 12 through hole 32. Alternatively, when hole 32 is a sensing port, parameters other than pitot pressure can be measured using pitot probe 10.

FIGS. 7 and 8 show probe head 12 after machining. Tip portion 37 of insert 20, outer shell 24, and tip weld 28 are machined to a final contour. Exterior surface 52 of outer shell 24, an exterior surface of tip weld 28, and exterior surface 40 of insert 20 are substantially smooth and outer shell 24, tip weld 28, and insert 20 have final outer diameters that are about equal, which are smaller than the outer diameters prior to machining. As seen in FIG. 8, interior surface 42 at tip portion 37 of insert is machined such that bore 44 increases in cross-sectional area with bore 44 having the greatest cross-sectional area at tip 18.

FIGS. 9A and 9B show probe head 12 assembled to strut 14. Second end 36 of insert 20, second braze 27, and second end 50 of outer shell 24 are inserted into first end of strut 14. As seen in FIG. 9A, heater 22 is further wrapped into a groove within strut 14. Heater 22 is then torch brazed to strut 14. In alternate embodiments, heater 22 may be connected to strut 14 via induction brazing, welding, or using any other suitable process. As seen in FIG. 9B, probe head 14 is brazed to strut 14 such that third braze 33 covers heater 22 between probe head 12 and strut 14, resulting in heater 22 not being visible from an exterior of pitot probe 10.

Tip weld 28 is connected to exterior surface 40 of insert 20 and exterior surface 52 of outer shell 24, allowing for external welding at gap G of probe head 14. Likewise, because insert 20 extends past outer shell 24, end portion 38 of insert 20 and second end 50 of outer shell 24 can be brazed externally. Holes 32 are drilled through hole weld 30 so as to avoid leak paths to heater 22. For example, if holes 32 were drilled through outer shell 24, first braze 26, and insert 20, a leak path could be introduced if the section of first braze 26 included a void in the area adjacent the hole.

Machining probe head 12 allows insert 20 to be in a more robust configuration during the formation of probe head 12, such as during brazing and welding processes, and still achieve the desired final geometry. Creating and inspecting tip weld 28 is easier, as access to gap G is external to probe head 12. Additionally, brazing and inspecting end portion 38 of insert 20 and second end 50 of outer shell 24 is easier, as access is also external to probe head 12 at exterior surface 40 of insert 20. Due to holes 32 being drilled through hole weld 30, heater 22 is protected from the external environment and avoids corrosion, even if internal voids are present within first braze 26 along heater 22.

Figure 10:
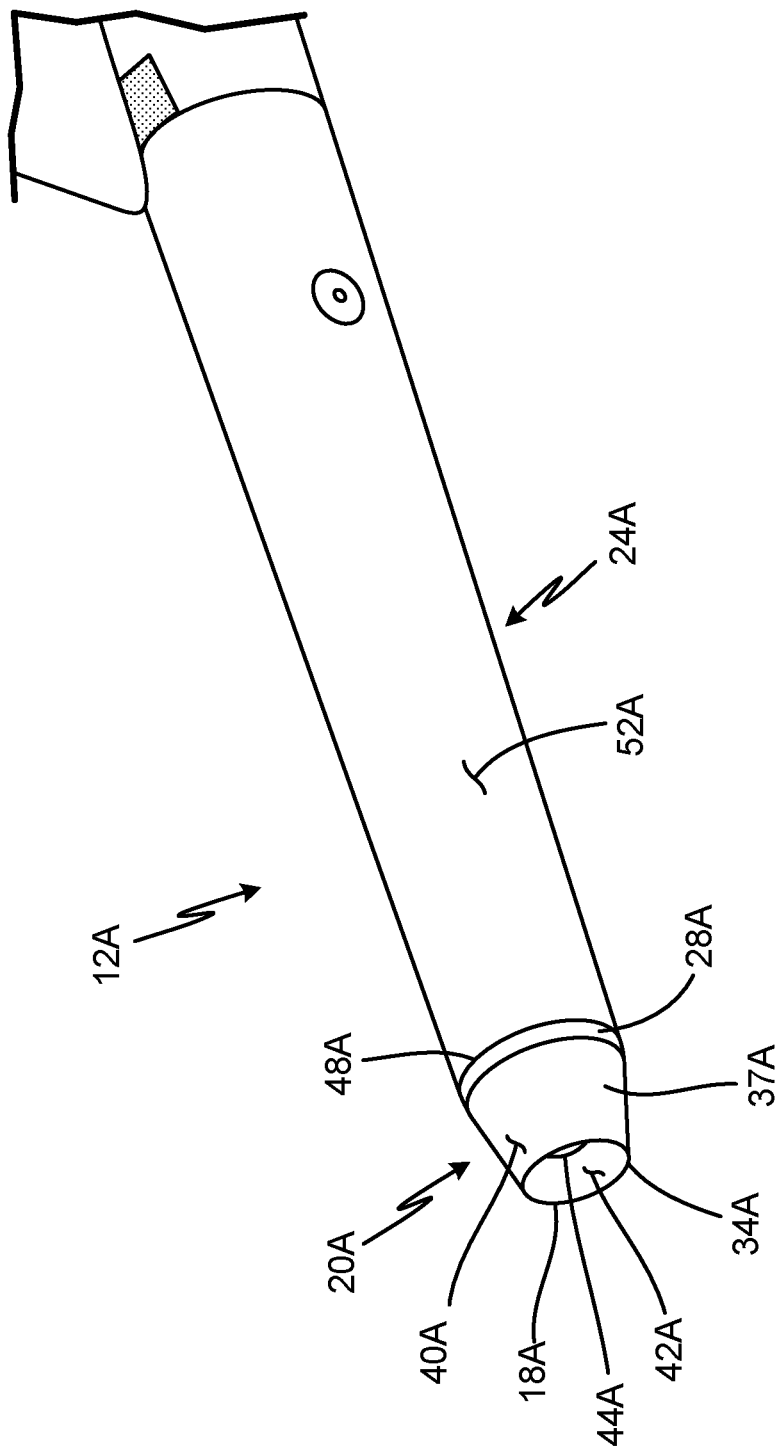
FIG. 10 is a partial perspective view of a second embodiment of a probe head.

FIG. 10 is a partial perspective view of a second embodiment of probe head 12A. Probe head 12A includes tip 18A, insert 20A outer shell 24A, and tip weld 28A. Insert 20A includes first end 34A, tip portion 37A, exterior surface 40A, interior surface 42A, and bore 44A. Outer shell 24A includes first end 48A, and exterior surface 52A.

Probe head 12A has a similar structure and function as probe head 12. However, tip portion 37A of insert 20A, outer shell 24A, and tip weld 28A are machined to a different final contour. Exterior surface 52A of outer shell 24A, an exterior of tip weld 28A, and exterior surface 40A of insert 20A are substantially smooth and outer shell 24A, tip weld 28A, and insert 20A have different final outer diameters. As seen in FIG. 10, end 48A of outer shell 24A, tip weld 28A, and tip portion 37A of insert 20A decrease in outer diameter toward tip 18A.

Tip portion 37A has a different final contour than tip portion 37 so that probe head 12A is impacted differently by various environmental conditions. For example, tip 18A may achieve better performance with ice crystals.

DISCUSSION OF POSSIBLE EMBODIMENTS

The following are non-exclusive descriptions of possible embodiments of the present invention.

A probe head of an air data probe includes an insert including: a tip portion making up a tip of the air data probe; an end portion; and a body portion extending between the tip portion and the end portion, the body portion including a groove; a portion of a heater within the groove; an outer shell surrounding the body portion of the insert and the portion of the heater; a tip weld between the tip portion of the insert and a first end of the outer shell; and a braze between the end portion of the insert and a second end of the outer shell; wherein the portion of the heater is hermetically sealed between the insert and the outer shell.

The probe head of the preceding paragraph can optionally include, additionally and/or alternatively, any one or more of the following features, configurations and/or additional components:

A hole providing fluidic communication between a bore defined within the insert and an outside of the outer shell.

The hole is a drain hole or a sensing port.

A weld in the outer shell extends from an exterior surface of the outer shell to an exterior surface of the insert.

The hole extends through the insert and the weld in the outer shell.

The outer shell is brazed to the body portion of the insert.

The insert, the outer shell, and the tip weld have outer diameters that are about equal.

The tip portion of the insert, the outer shell, and the tip weld have different outer diameters.

A probe head of an air data probe includes an insert including: a first end; a second end opposite the first end; a helical groove extending into an exterior surface of the insert between the first end and the second end; and a bore extending through the insert; an electric resistance heater within the helical groove of the insert; an outer shell surrounding the insert and the heater and connected to the insert and the heater via a first braze, the outer shell including: a first end; a second end opposite the first end; a hole in the outer shell, the hole extending from an exterior surface of the outer shell to an interior surface of the outer shell; and a hole weld filling the hole in outer shell and extending to the insert; and a drain hole or a sensing port extending into the bore in the insert through the weld in the outer shell and through the insert; wherein the first end of the insert extends beyond the first end of the outer shell, and the second end of the insert extends to the second end of the outer shell.

The probe head of the preceding paragraph can optionally include, additionally and/or alternatively, any one or more of the following features, configurations and/or additional components:

The second end of the insert extends beyond the second end of the outer shell.

A tip weld between the insert and the first end of the outer shell.

A second braze connecting the second end of the insert and the second end of the outer shell.

The heater within the probe head is fully encapsulated between the insert and the outer shell.

The first end of the insert makes up a tip of the probe head.

The drain hole or the sensing port is hermetically sealed from the heater.

A method of forming a probe head, the method including inserting an insert with a portion of a heater into an outer shell of the probe head; brazing the outer shell to the insert and the portion of the heater; welding a gap between a tip portion of the insert at a first end of the insert and a first end of the outer shell; brazing an end portion of the insert and a second end of the outer shell; and hermetically sealing the portion of the heater between the insert and the outer shell.

The method of the preceding paragraph can optionally include, additionally and/or alternatively, any one or more of the following features, configurations and/or additional components:

The gap is welded and the second end of the insert and the end portion of the outer shell are brazed externally.

Forming a hole through the outer shell and the insert therethrough providing fluidic communication from a bore defined within the insert to an outside of the outer shell without violating the hermetic seal.

Welding a hole in the outer shell to form a hole weld that fills the hole and extends from an exterior surface of the outer shell to an exterior surface of the insert; and drilling a hole into the hole weld and through the insert into a bore within the insert.

Brazing the probe head to a strut to attach the probe head to the strut.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A probe head of an air data probe comprising:
an insert including:
a tip portion making up a tip of the air data probe;
an end portion; and
a body portion extending between the tip portion and the end portion, the body portion including a groove;
a portion of a heater within the groove;
an outer shell surrounding the body portion of the insert and the portion of the heater,
wherein the tip portion of the insert extends past a first end of the outer shell and the end portion of the insert extends past a second end of the outer shell;
a tip weld seal between the tip portion of the insert and the first end of the outer shell; and
a braze seal being located adjacent to the second end of the outer shell and between the end portion of the insert and the second end of the outer shell, the braze seal connecting the end portion of the insert and the second end of the outer shell;
wherein the portion of the heater is hermetically sealed between the insert and the outer shell.

2. The probe head of claim 1, further including a hole providing fluidic communication between a bore defined within the insert and an outside of the outer shell.

3. The probe head of claim 2, wherein the hole is a drain hole or a sensing port.

4. The probe head of claim 2, wherein a welded region in the outer shell extends from an exterior surface of the outer shell to an exterior surface of the insert.

5. The probe head of claim 4, wherein the hole extends through the insert and the welded region in the outer shell.

6. The probe head of claim 1, wherein the outer shell is brazed to the body portion of the insert.

7. The probe head of claim 1, wherein the tip portion of the insert, the outer shell, and the tip weld seal have outer diameters that are about equal.

8. The probe head of claim 1, wherein the tip portion of the insert, the outer shell, and the tip weld seal have different outer diameters.

9. A probe head of an air data probe comprising:
an insert including:
a first end;
a second end opposite the first end;
a helical groove extending into an exterior surface of the insert between the first end and the second end; and
a bore extending through the insert;
an electric resistance heater within the helical groove of the insert;
an outer shell surrounding the insert and the heater and connected to the insert and the heater via a first braze, the outer shell including:
a first end;
a second end opposite the first end;
a hole in the outer shell, the hole extending from an exterior surface of the outer shell to an interior surface of the outer shell; and
a welded region filling the hole in the outer shell and extending to the insert; and
a drain hole or a sensing port extending into the bore in the insert through the welded region in the outer shell and through the insert;
wherein the first end of the insert extends beyond the first end of the outer shell, and the second end of the insert extends to the second end of the outer shell.

10. The probe head of claim 9, wherein the second end of the insert extends beyond the second end of the outer shell.

11. The probe head of claim 9, further including a tip weld seal between the insert and the first end of the outer shell.

12. The probe head of claim 9, further including a braze seal between the second end of the insert and the second end of the outer shell.

13. The probe head of claim 9, wherein the heater within the probe head is fully encapsulated between the insert and the outer shell.

14. The probe head of claim 9, wherein the first end of the insert makes up a tip of the probe head.

15. The probe head of claim 9, wherein the drain hole or the sensing port is hermetically sealed from the heater.

* * * * *